(12) United States Patent
Tiwari et al.

(10) Patent No.: US 12,682,178 B2

(45) Date of Patent: Jul. 14, 2026

(54) NEURAL DIALOGUE SYSTEM FOR SECURITY POSTURE MANAGEMENT

(71) Applicant: Palo Alto Networks, Inc., Santa Clara, CA (US)

(72) Inventors: Praveen Tiwari, Milpitas, CA (US); Gaurav Sharma, Mountain View, CA (US); Jack Stephen Edmonds, San Jose, CA (US); Dylan Stewart Spagnuolo, Santa Clara, CA (US); Shuhong Chen, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 321 days.

(21) Appl. No.: 18/490,067

(22) Filed: Oct. 19, 2023

(65) Prior Publication Data

US 2025/0131200 A1 Apr. 24, 2025

(51) Int. Cl.
*G06F 40/30* (2020.01)
*G06F 40/35* (2020.01)

(52) U.S. Cl.
CPC .................................... *G06F 40/35* (2020.01)

(58) Field of Classification Search
CPC ....................................................... G06F 40/35
See application file for complete search history.

(56) References Cited

U.S. PATENT DOCUMENTS

| | | | |
|---|---|---|---|
| 11,765,207 B1 | 9/2023 | McCarthy | |
| 2019/0384415 A1* | 12/2019 | Zeinali Zadeh Ranjhbar ............. | |
| | | | G06F 40/274 |
| 2021/0349906 A1* | 11/2021 | Gladwin ............. | G06F 16/2428 |
| 2023/0237053 A1* | 7/2023 | Dangoor ........... | G06F 16/24539 |
| | | | 707/767 |
| 2023/0315722 A1* | 10/2023 | Saxe ................... | G06F 16/3322 |
| | | | 726/1 |

OTHER PUBLICATIONS

"Z3 decision procedure", [online], [retrieved on Oct. 17, 2023] Retrieved from the Internet: < https://github.com/Z3Prover/z3>, Apr. 13, 2015.

(Continued)

*Primary Examiner* — Sonia L Gay
(74) *Attorney, Agent, or Firm* — GILLIAM IP PLLC

(57) ABSTRACT

A neural dialogue system has been designed to present a conversational user interface for managing security posture of an organization. The neural dialogue system determines intent and extracts entity names from a user input. The neural dialogue system grounds the entity names to an organizational context and maps the intent to a defined functionality related to security posture management for intent realization. Some of these defined functions involve editing the ordered ruleset. When realization of an intent involves editing the ordered ruleset, the neural dialogue system determines various ruleset command sequences that implement the ruleset editing and corresponding impacts on the ordered ruleset (e.g., creation of ruleset anomalies). The dialogue system collects the information retrieved based on the intent and grounded entities, including any ruleset impact assessment, and generates a response.

20 Claims, 9 Drawing Sheets

100

(56) References Cited

OTHER PUBLICATIONS

Bhargavan, et al., "Verifying Policy-Based Web Services Security", ACM Transactions on Programming Languages and Systems, vol. 30, No. 6, Article30, 59pages. DOI=10.1145/1391956.1391957 <http://doi.acm.org/10.1145/1391956.1391957>, Oct. 2008.

Hao, et al., "Language Models are General-Purpose Interfaces", [online], [retrieved on Oct. 17, 2023] Retrieved from the Internet: <https://arxiv.org/abs/2206.06336>, Jun. 13, 2022.

Huang, et al., "Embedding-based Retrieval in Facebook Search", [online], [retrieved on Oct. 17, 2023] Retrieved from the Internet :<https://arxiv.org/abs/2006.11632v1>, Jun. 20, 2020.

Margheri, et al., "On Properties of Policy-Based Specifications", [online], [retrieved on Oct. 17, 2023] Retrieved from the Internet: <https://arxiv.org/abs/1508.03903>, Aug. 17, 2015.

Soliman, et al., "A Graph Neural Network Approach for Scalable and Dynamic IP Similarity in Enterprise Networks", [online], [retrieved on Oct. 17, 2023] Retrieved from the Internet: <https://arxiv.org/abs/2010.04777>, Oct. 9, 2020.

PCT Application No. PCT/US2024/051959, International Search Report and Written Opinion mailed Feb. 4, 2025, 8 pages.

* cited by examiner

100

Security Posture Management Neural Dialogue System

Conversational Interface
102

Generative Language Model
106

Natural Language Understanding Model
101

Augmentation
110

Grounding And Intent Mapping
103

Information Retrieval
108

Ruleset Edit Impact Assessor
105

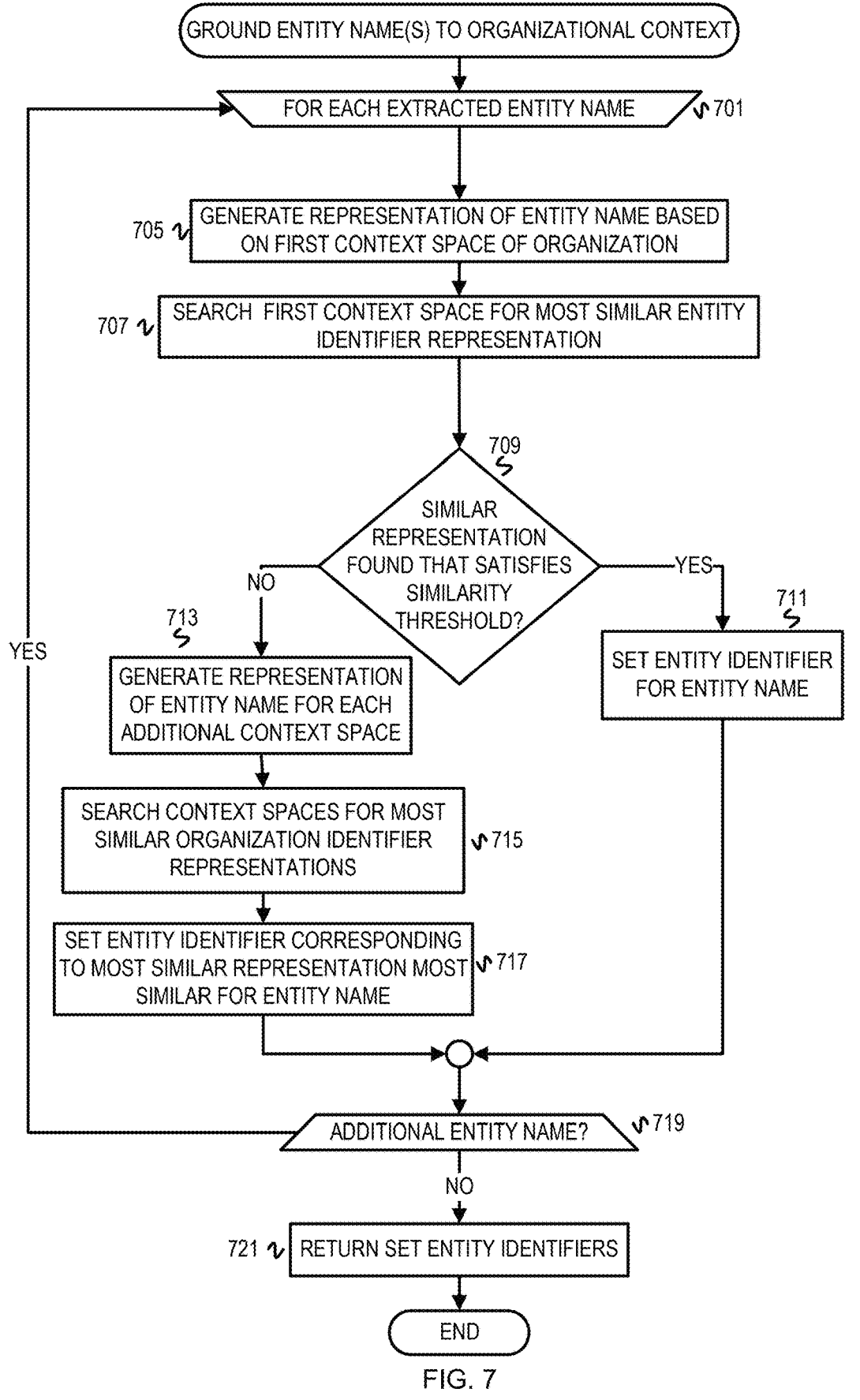

GROUND ENTITY NAME(S) TO ORGANIZATIONAL CONTEXT

FOR EACH EXTRACTED ENTITY NAME — 701

705 — GENERATE REPRESENTATION OF ENTITY NAME BASED ON FIRST CONTEXT SPACE OF ORGANIZATION

707 — SEARCH FIRST CONTEXT SPACE FOR MOST SIMILAR ENTITY IDENTIFIER REPRESENTATION

709 — SIMILAR REPRESENTATION FOUND THAT SATISFIES SIMILARITY THRESHOLD?

NO

YES

711 — SET ENTITY IDENTIFIER FOR ENTITY NAME

713 — GENERATE REPRESENTATION OF ENTITY NAME FOR EACH ADDITIONAL CONTEXT SPACE

SEARCH CONTEXT SPACES FOR MOST SIMILAR ORGANIZATION IDENTIFIER REPRESENTATIONS — 715

SET ENTITY IDENTIFIER CORRESPONDING TO MOST SIMILAR REPRESENTATION MOST SIMILAR FOR ENTITY NAME — 717

YES

ADDITIONAL ENTITY NAME? — 719

NO

721 — RETURN SET ENTITY IDENTIFIERS

END

FIG. 7

NEURAL DIALOGUE SYSTEM FOR SECURITY POSTURE MANAGEMENT

BACKGROUND

The disclosure generally relates to computing arrangements based on computational models (e.g., CPC G06N) and electrical digital data processing related to handling natural language data (e.g., CPC G06F 40/00).

Dialogue systems are sometimes referred to as chatbots, conversation agents, or digital assistants. While the different terms may correspond to different types of dialogues systems, the commonality is that they provide a conversational user interface. Some functionality of dialogue systems includes intent classification and entity extraction. Dialogue systems have been designed as rule-based dialogue systems and many commercially deployed dialogue systems are rule-based. However, statistical data-driven dialogue systems that use machine learning have become a more popular approach. A statistical data-driven dialogue system has components that can include a natural language understanding (NLU) component, a dialogue manager, and a natural language generator. Some statistical data-driven dialogue systems use language models or large language models. A language model is a probability distribution over sequences of words or tokens. A large language model (LLM) is "large" because the training parameters are typically in the billions. Neural language model refers to a language model that uses a neural network(s), which includes Transformer-based LLMs.

The "Transformer" architecture was introduced in VASWANI, et al. "Attention is all you need" presented in Proceedings of the 31st International Conference on Neural Information Processing Systems on December 2017, pages 6000-6010. The Transformer is a first sequence transduction model that relies on attention and eschews recurrent and convolutional layers. Architecture of a Transformer model typically is a neural network with transformer blocks/layers, which include self-attention layers, feed-forward layers, and normalization layers. The Transformer model learns context and meaning by tracking relationships in sequential data. The Transformer architecture has been referred to as a "foundational model." The Center for Research on Foundation Models at the Stanford Institute for Human-Centered Artificial Intelligence used this term in an article "On the Opportunities and Risks of Foundation Models" to describe a model trained on broad data at scale that is adaptable to a wide range of downstream tasks.

BRIEF DESCRIPTION OF THE DRAWINGS

Embodiments of the disclosure may be better understood by referencing the accompanying drawings.

FIG. 7 is a flowchart of example operations for grounding entity name(s) to an organization context.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Overview

A neural dialogue system has been designed to present a conversational user interface for managing security posture of an organization. The management of security posture includes on-demand awareness of a dynamic and large security ruleset (possibly in hundreds of thousands) and determining change impacts to a vast and dynamic ordered ruleset. The neural dialogue system determines intent and extracts entity names from a user input. The neural dialogue system grounds the entity names to an organizational context and maps the intent to a defined functionality related to security posture management for intent realization. An intent or sub-intent may involve configuring/editing the ordered ruleset. When an intent relates to editing the ordered ruleset, the neural dialogue system determines a lowest impact implementation to fulfill the configuration related intent. The neural dialogue system collects the information retrieved based on the intent and grounded entities, including any ruleset impact assessment, and generates a response. With the neural dialogue system presenting a least impact implementation of a ruleset edit, multiple problems (e.g., misconfiguration, policy bloat, policy sprawl, etc.) can be at least reduced if not avoided.

Example Illustrations

Figure 1:
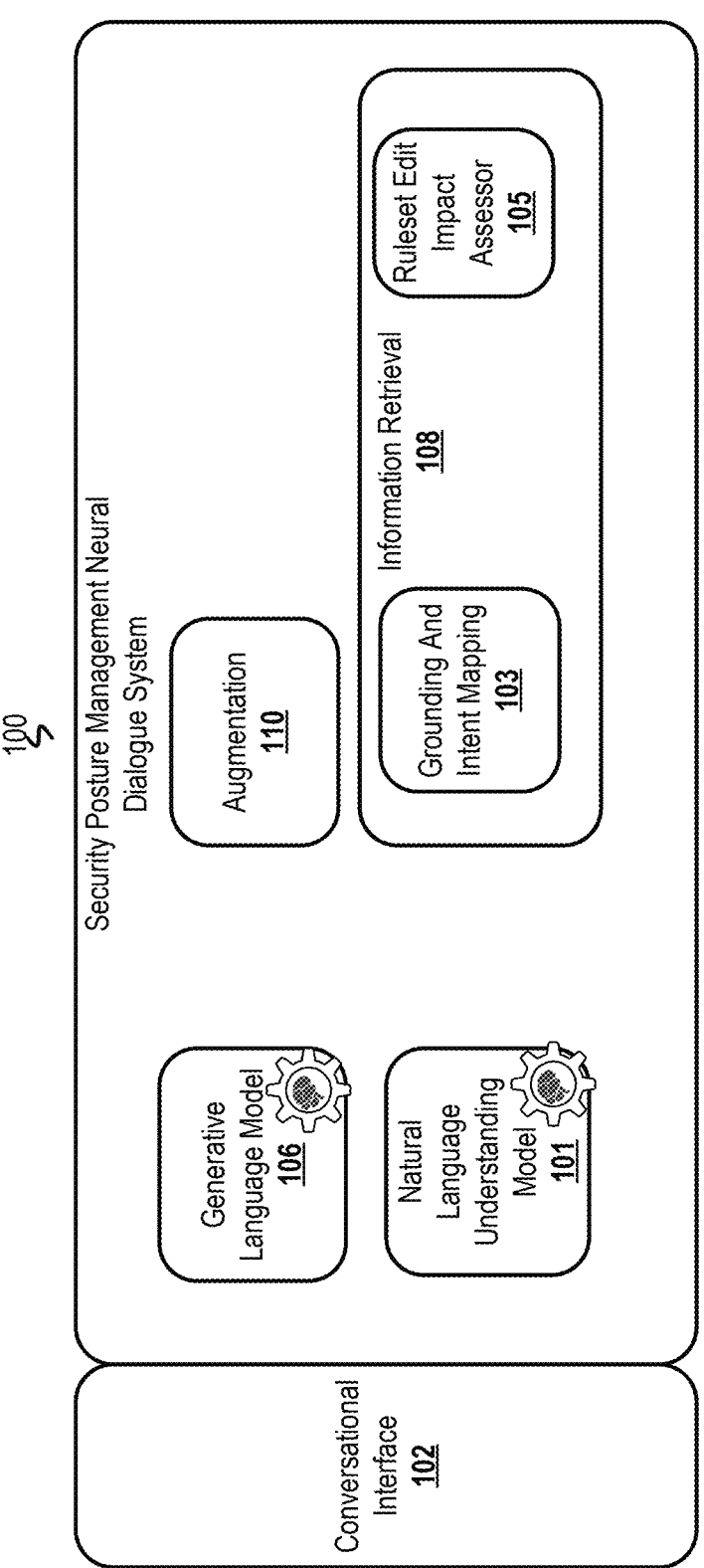
FIG. 1 depicts an example diagram of a security posture management neural dialogue system.

FIG. 1 depicts an example diagram of a security posture management neural dialogue system. A security posture management neural dialog system 100 (hereinafter "neural dialogue system") includes a conversational interface 102, a natural language understanding (NLU) model 101, a generative language model 106, an information retrieval component 108 and an augmentation component 110. The information retrieval component 108 includes a grounding and intent mapping component 103 and a ruleset edit impact assessor 105. Some of the depicted components represent program code and others represent machine learning (ML) or artificial intelligence (AI) models. Naming of the program code components are intended to succinctly express the functionality of the program code but should not be used to limit the disclosure or scope of claims. Structure and organization of a program can vary due to platform, programmer/architect preferences, programming language, etc. In addition, names of code units (programs, modules, methods, functions, etc.) can vary for the same reasons and can be arbitrary. Similarly, names of model components are based on the terms currently used in literature. However, even these names based on existing literature should not be used to limit the disclosure or scope of the claims in light of the rapidly changing nature of ML/AI technology and dynamic terminology.

The conversational interface 102 is an interface to the neural dialogue system 100 for receiving user inputs (sometimes referred to as prompts or utterances) and for responding to user inputs. The conversational interface 102 may be a user interface (e.g., a graphical user interface or command line interface). In other implementations, the conversational interface 102 is an application programming interface (API) that allows interaction between a host/device receiving user input from a user interface to communicate the user input to a host(s)/device(s) hosting the neural dialogue system 100.

The NLU model 101 is a language model that generates intent and extracts entity names from a user input. Training of a model to yield the NLU model 101 can vary depending on the base model, training data, etc. For instance, a pre-trained generative AI model or LLM can be fine-tuned to generate intents with training data (e.g., curated or sampled utterances) from a semantic space corresponding to security posture management. This can also be done with a few-shot prompting.

The augmentation 110 and information retrieval 108 components facilitate in-context learning for the generative language model 106. The information retrieval component 108 obtains information based on the intent and entity names generated by the NLU model 101. This includes the grounding and intent mapping component 103 grounding the extracted entity names to a context of an organization using the neural dialogue system 100.

The grounding and intent mapping component 103 includes or has access to data sources in one or more context spaces of the organization that are used for grounding the entity names. For example, the data from a configuration management database and an identity access and management database can be organized and stored in a repository accessible by the grounding and intent mapping component 103, assuming the organization does not want to provide the information retrieval component 108 direct access to its databases. Representations of the organizational entity identifiers that allow for efficient comparison for similarity are likely created. The grounding and intent mapping component 103 can generate representations of the extracted entity names with the algorithm or technique used to create the representations of the organizational entity identifiers and determine similarity to ground the extracted entity names to the most similar organizational entity identifiers. The grounding and intent mapping component 103 also maps generated intents to defined functions of the organization, for example API functions. With a defined function, the information retrieval component 108 can populate the defined function with the organizational entity identifier(s) and obtain information corresponding to the intent. In some cases, the defined function is a query of a data source of the organization. This can include a query of structural metadata about a ruleset (e.g., how large is the ruleset). This type of query does not involve analyzing the rules or reading fields of the rules in the ruleset. However, an intent can involve querying the ruleset or editing the ruleset. If the information retrieval component 108 can access the ruleset of the organization, then the information retrieval component 108 can run queries on the ruleset. If access to the ruleset is restricted to the ruleset edit impact assessor 105, then the information retrieval component 108 passes ruleset queries as well as ruleset edits to the ruleset edit impact assessor 105.

If both ruleset queries and ruleset configurations/edits are passed to the ruleset edit impact assessor 105 (hereinafter "assessor"), then the assessor 105 has two paths of operations. For ruleset queries, then assessor 105 will run the passed query on the ruleset. For edits, the assessor 105 accesses a model of the ruleset to determine a fulfillment of a ruleset configuration/edit intent conveyed from the NLU model 101 that satisfies (or best satisfies) an objective as represented by an objective function. The objective for the assessor 105 is to determine how to fulfill an intent conveyed to the assessor 105 with minimal increase in ruleset anomalies. Thus, an objective function is defined that calculates created anomalies for a ruleset state and determines whether the calculated number of created anomalies exceeds a bound or limit defined by the objective function. This involves both determining a simulated or hypothetical ruleset state resulting from a ruleset configuration command subsequent to zero or more preceding commands and calculating a delta in ruleset anomalies with respect to the initial state of the ruleset. Implementation of the assessor 105 can use a symbolic reasoning engine and sequential analysis.

The assessor 105 maintains a model of an ordered ruleset for the symbolic reasoning engine. To build the model, the array of possibilities are expressed based on dimensions and relations among objects of a dimension. For instance, a grammar is established based on the dimensions or fields that can occur in a rule. For security posture management, the dimensions may be address, zone, interface, user, application, interface, and service, some of which may distinguish between source and destination (e.g., source address, destination address, source zone, destination zone, etc.). Additional examples of dimensions include URL category and destination device. Relations between objects or instances of the dimensions are also established. In other words, objects across dimensions can be related to form a security rule. In the case of the symbolic reasoning engine being a satisfiability modulo theorem (SMT) solver, formulas are defined for anomalies in relationships among the rules. The types of anomalies include shadowing anomaly, correlation anomaly, generalization anomalies, and redundancy anomaly. Formulas are not limited to anomalies. For instance, a formula can be defined to indicate when a consolidation opportunity exists. If an anomaly formula is satisfied, then the corresponding rules relationship anomaly exists. A statistical model can also be used to analyze a model to determine whether overlapping rules occur in a ruleset. Fulfillment of a ruleset configuration intent involves ruleset configuration commands ("ruleset command") or a sequence of ruleset commands. Example ruleset commands include, reorder/move, insert, merge, modify, and split. The assessor 105 determines different implementations of a ruleset configuration intent with these ruleset commands. The combination of the symbolic reasoning engine and sequential analysis successively builds different paths of ruleset commands and resulting ruleset states. At each resulting state, the assessor 105 assesses whether the state fulfills the intent and whether the impact of that path satisfies the objective function. If a path fails the objective function, then the path is no longer considered. Results of the symbolic reasoning and sequential analysis will indicate which, if any, anomalies are created for each implementation of the intent conveyed to the assessor 105. The assessor 105 provides this information as part of the information retrieval.

After obtaining information based on the intent and the extracted entities, the information retrieval component 108 provides the retrieved information to the augmentation component 110. The retrieved information can be one or more query results and/or the impact assessment of a ruleset edit. The augmentation component 110 creates an augmented prompt with the retrieved information and the user input. The augmentation component 110 feeds the augmented prompt into the generative language model 106 to obtain a response. The response is provided via the conversational interface 102. The neural dialogue system 100 may also maintain dialogue states for either or both of the NLU model 101 and the generative language model 106 to provide additional context.

While the example diagrams in FIGS. 1-5 include a separate model response generation, this is not necessary. Embodiments can use templates in response generation. Embodiments can use a same model for NLU (e.g., intent classification and entity extraction) and response generation with different prompts. Indeed, embodiments can use smaller/lighter models for the different tasks.

Figure 2:
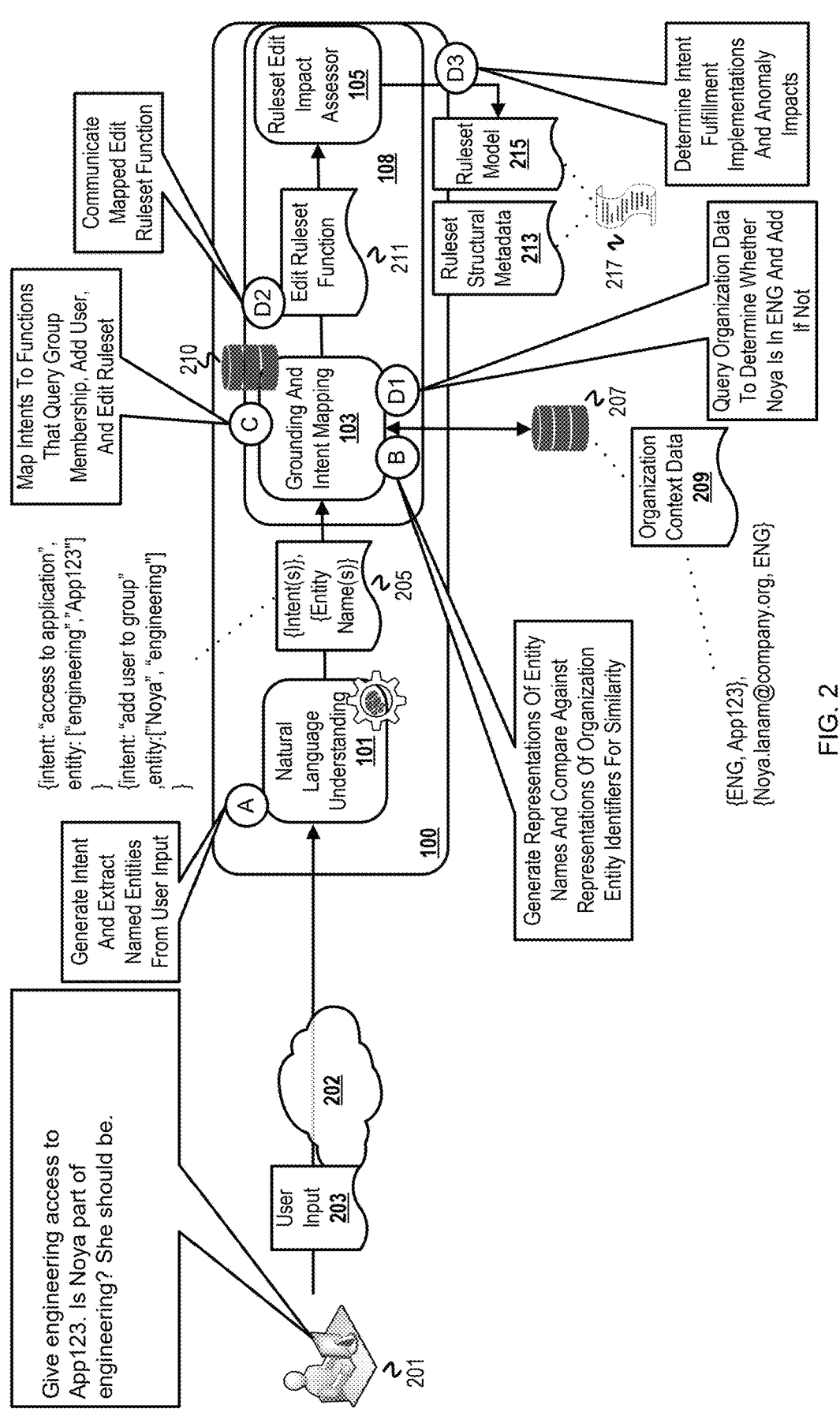
FIGS. 2-5 are diagrams of the neural dialogue system receiving example user inputs and providing examples responses.

FIGS. 2-5 are diagrams of the neural dialogue system receiving example user inputs and providing examples responses. Each of the figures does not depict all components of the neural dialogue system 100 but depicts those relevant to the illustrated examples. In FIG. 2, a user enters "Give engineering access to App123. Is Noya part of engineering? She should be." in a user interface presented at a machine 201. In this example, the neural dialogue system 100 is hosted remotely from the machine 201. Thus, the machine 201 communicates a user input 203 via a network 202 to the neural dialogue system 100.

Each of FIGS. 2-5 is annotated with letters denoting stages, each of which represents one or more operations. Although these stages are ordered for this example, the stages illustrate one example to aid in understanding this disclosure and should not be used to limit the claims. Subject matter falling within the scope of the claims can vary from what is illustrated. FIG. 2 is annotated with stages A-C and D1-D3.

At stage A, the NLU model 101 generates intents and extracts named entities based on the user input 203. In this illustration, the NLU model 101 generates intents "access to application" and "add user to group." For the intent "access to application" the NLU model 101 extracts entity names "engineering" and "App123." For the intent "add user," the NLU model 101 extracts entity names "Noya" and "engineering." These can be recorded as field to value mappings or key to value mappings. The NLU model 101 generates output 205 with the intents and entity names and communicates the output 205 to the grounding and intent mapping component 103.

At stage B, the grounding and intent mapping component 103 grounds the extracted entity names to the context of the organization based on organization context data 209. In this example illustration, the organization context data 209 has been collected into a database 207 accessible by the grounding and intent mapping component 103. The organization context data 209 may be compact representations of context data or compact representations of the context data and the context data. The grounding and intent mapping component 103 operates with compact representations for efficient grounding. The grounding and intent mapping component 103 generates representations of entity names and compares them against the representations of the context data 209. With an example of the context data 209 including embeddings of usernames, the neural dialogue system 100 uses a language model to generate embeddings of the usernames for each semantic space of an organization (e.g., a semantic space for the IAM context and a semantic space for the configuration management context). For this example, the grounding and intent mapping component 103 determines a most similar username for Noya is Noya. Ianam@company.org, the most similar organizational identifier for App123 is an application name App123, and a most similar organizational identifier for engineering is ENG.

At stage C, the grounding and intent mapping component 103 maps intents to functions that query group membership, add a user, and edit a ruleset. The NLU component 101 generated the intents "access to application" and "add user to group." With few shot prompting or fine tuning, the NLU component 101 will generate a set of known intents. Based on these known intents, mappings will have been created between the intents and function templates defined by a service provider (i.e., the owner or manager of the dialogue system), such as templates of API functions. The mappings can be m: n (i.e., multiple intents can map to a same function and an intent can map to multiple functions). The grounding and intent mapping component 103 is depicted with a store 210 which hosts the mappings of intents to defined function templates. These mappings can be stored remotely and be accessible by the grounding and intent mapping component 103. In this example, the intent "access to application" maps to a function template defined for editing the ruleset to give an identified entity access to an identified application. The template is created with fields for populating with arguments, in this case a field to identify an application and field to identify an entity to be given access to the identified application. The grounding and intent mapping component 103 populates the edit ruleset function template with "ENG" and "App123." To determine the appropriate field to populate, the grounding process includes determining an entity type (e.g., user, application, group, etc.) that is associated with the matched identifier. This allows the grounding and intent mapping component 103 to map the grounded entity names to the fields in the mapped function template. The intent "add user to group" can map to multiple functions: a first function to determine whether an identified entity is already a member of an identified group entity and then a second function that conditionally executes to add an identified entity to an identified group entity depending upon the result of the first function. In some implementations, the intent can map to a single defined function that includes the multiple operations of checking membership and then adding a user to a group if not already a member.

At stages D1-D3, the information retrieval component 108 performs operations for information retrieval according to the output of the grounding and intent mapping component 103. At stage D1, the information retrieval component 108 queries data of the organization to determine whether Noya is a member of the ENG group. Depending upon implementation, the information retrieval component executes the populated function which queries the repository 207 or the IAM database of the organization and then adds Noya as a member if the result of the query is negative. The information retrieval component 108 stores the query result for prompt augmentation and response generation described later. If the "add user to group" intent mapped to two function templates (i.e., a query function template and an add user to group function template), then the information retrieval component 108 executes the second function.

After populating the function template that mapped to the intent "access to application" with "ENG" and "App123," to instantiate an edit ruleset function 211, the information retrieval component 108 communicates the edit ruleset function instance 211 to the ruleset edit impact assessor 105 at stage D2. The intent mapped to a ruleset edit function template in this example, but embodiments are not so limited. For instance, a natural language intent to configure the ruleset to give ENG access to App123 can be conveyed to the assessor 105, in which case the assessor 105 determines an acceptable fulfillment of the configuration intent as previously discussed. Due to the complexity of ruleset management, the dialogue system 100 passes a ruleset configuration intent, in this case conveyed as a ruleset edit function, to the ruleset edit impact assessor 105 to determine impact and generate a recommendation based on the impact.

At stage D3, the ruleset edit impact assessor 105 determines various implementations to fulfill the edit ruleset function 211 and determines impacts in terms of created anomalies. The ruleset edit impact assessor 105 uses a ruleset model 215 that is based on an ordered firewall ruleset 217. FIG. 2 also depicts ruleset structural metadata 213 for the ordered ruleset 217. An intent may involve querying the structural metadata 213 instead of ruleset editing. For these cases, the information retrieval component 108 can run a query function on the structural metadata 213. Returning to the example of editing the ruleset 217, the ruleset model 215 expresses relationships among rules based on ordering and elements of the rules. The elements of a rule include matching criteria (e.g., source and destination addresses, services identified by protocol and port, etc.) and an action when a protocol data unit (PDU) or packet matches the matching criteria. The ruleset model 215 is built based on how the ruleset edit impact assessor 105 will analyze impact of each implementation on the ruleset (e.g., a symbolic reasoning engine).

Figure 3:
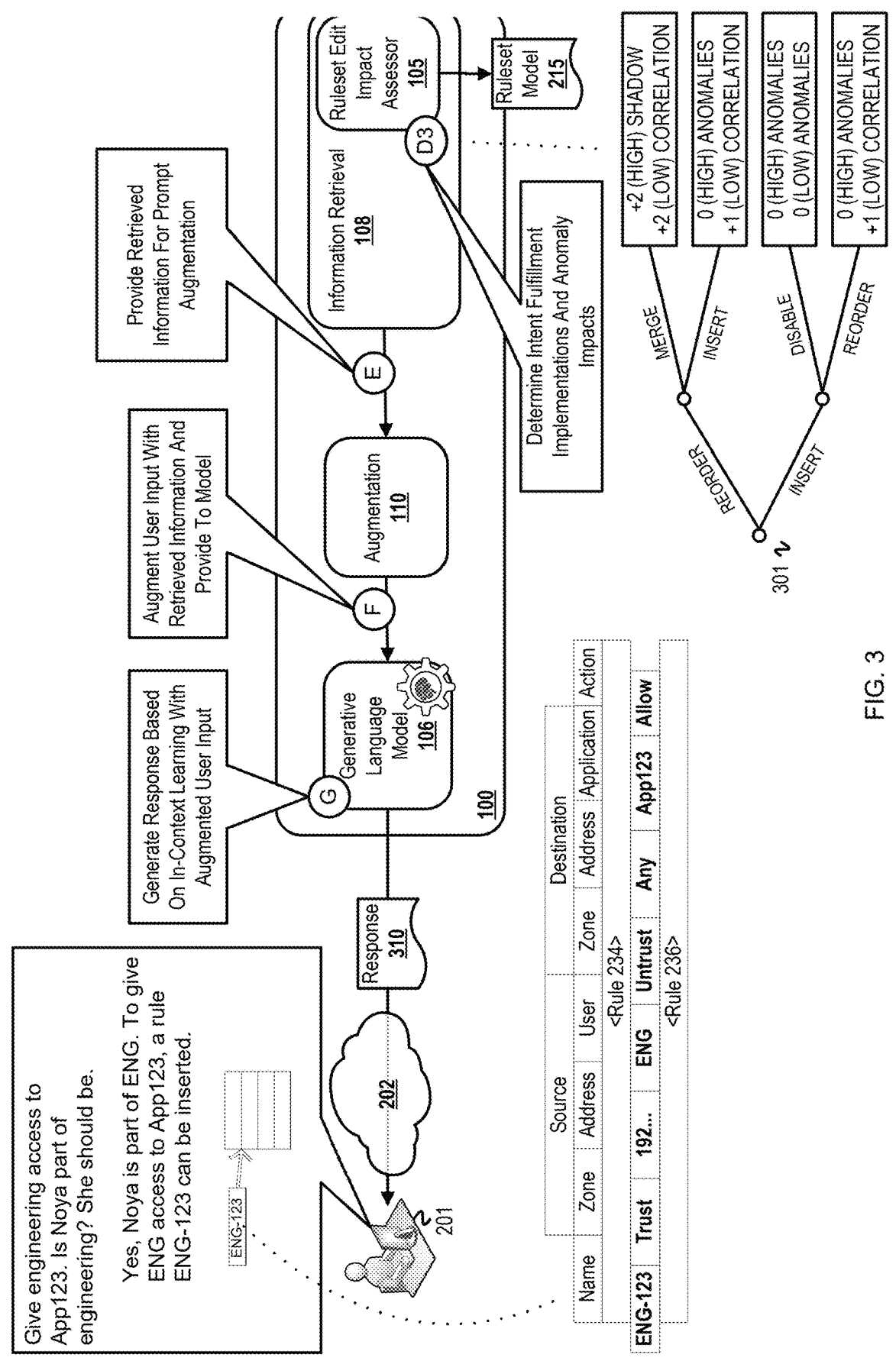

FIG. 3 is an example diagram of responding to the user input from FIG. 2. FIG. 3 is annotated with letters D3 and E-G for the stages of operations continuing from FIG. 2. FIG. 3 depicts a structure 301 that provides a perspective of the analysis performed by the ruleset edit impact assessor 105. The structure 301 includes different paths to fulfilling the edit ruleset function 211. Each edge of the structure 301 represents a ruleset command as labeled. Each node in the structure 301 represents a state of the ordered ruleset 217 expected after the preceding one or more ruleset commands is performed. A first path includes a sequence of ruleset commands REORDER and MERGE. After each resulting state is determined, the ruleset edit impact assessor 105 evaluates the ruleset state against the defined objective function to limit an increase in ruleset anomalies to 2. This REORDER-MERGE command sequence results in creation of 2 shadow anomalies and 2 correlation anomalies. The ruleset edit impact assessor 105 has been configured to characterize shadow anomalies as high impact and correlation anomalies as low impact. The impact characterization can be a factor in comparing results to inform a recommendation. A second path includes the command sequence REORDER-INSERT and yields no high impact anomalies and 1 correlation anomaly. A third path includes the command sequence INSERT-DISABLE and does not create any ruleset anomalies. A fourth path includes the command sequence INSERT-REORDER and creates 1 correlation anomaly but no high impact anomalies. With this example, the ruleset edit impact assessor 105 would recommend the command sequence INSERT-DISABLE to implement the edit ruleset function 211.

At stage E, the information retrieval component 108 provides retrieved information to the augmentation component 110. The retrieved information in this example includes the result of query about membership of Noya in the ENG group and recommendation for the INSERT-DISABLE command sequence implementation for giving ENG access to App123.

At stage F, the augmentation component 110 uses the retrieved information to create an augmented prompt to input to the generative language model 106. To create the augmented prompt, the augmentation component 110 constructs a prompt with the user input 203 and the retrieved information. The arrangement of the user input 203 and the retrieved information can be according to some analysis of the user input 203. For instance, the augmentation component 110 can arrange the different retrieved information based on the ordering of intents within the user input 203.

At stage G, the generative language model 106 generates a response to the user input 203 informed with in-context learning based on the augmented prompt input by the augmentation component 110. In this example, the generative language model 106 generates a response "Yes, Noya is part of ENG. To give ENG access to App123, a rule ENG-123 can be inserted." followed by a visualization. A response may also include a natural language explanation of the change details. Abstracting away specific function details for carrying out the change behind the scenes increases use to a broader audience. For example, a table could be displayed showing where a new rule would be inserted, with relevant fields highlighted and surrounding rules shown above and below it for context. Implementations may provide the function details. For example, a representational state transfer architectural (REST)ful function instance for editing the ruleset may be indicated, such as "GET . . . action=insert, user=ENG, appid=App123, ruleid=ENG-123 . . . ".

Figure 4:
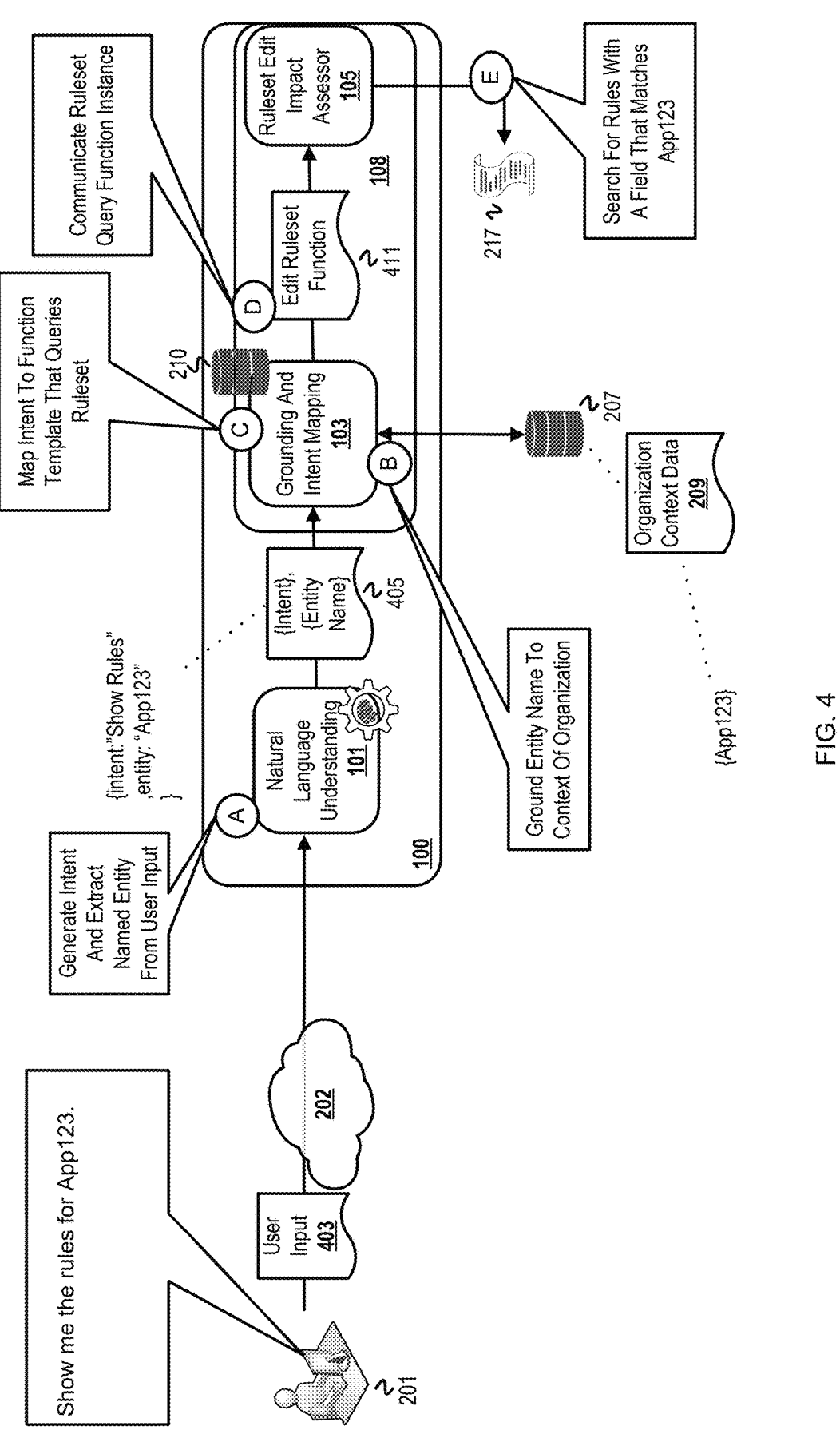
Figure 5:
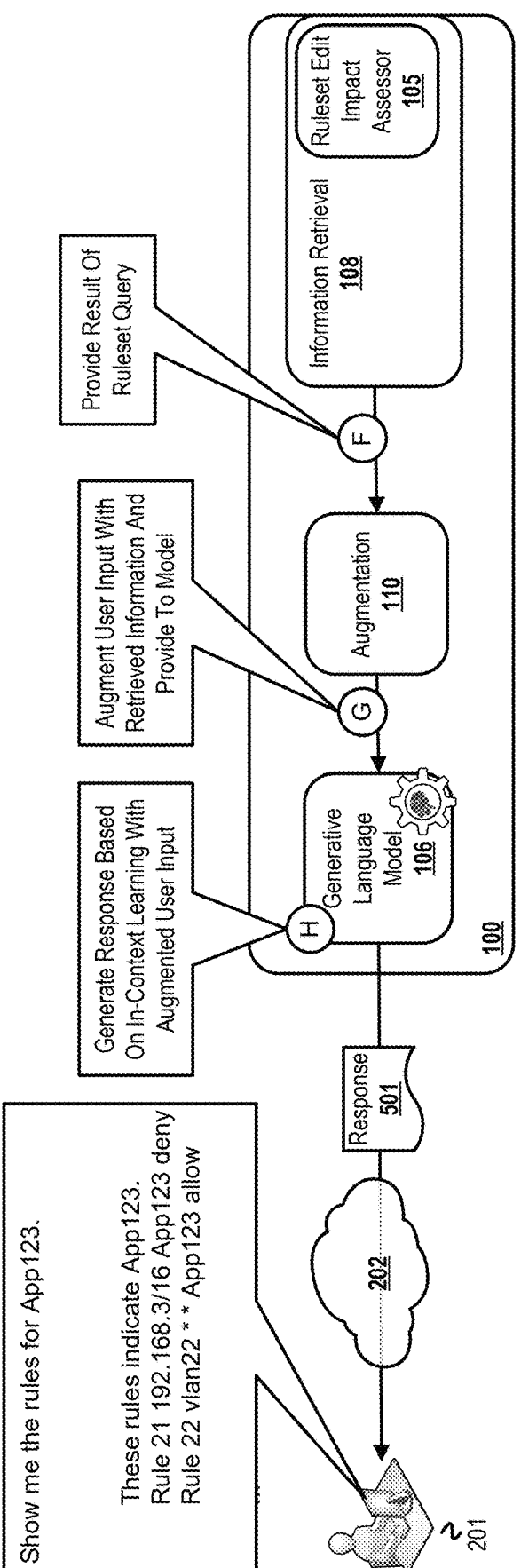

While FIGS. 2-3 include discussion of querying structural metadata of a ruleset and analyzing a ruleset model to determine impact of an edit to the ruleset, an intent may map to a querying task on the ruleset without an edit. FIG. 4 is a diagram of the dialogue system 100 receiving a user input involving a task of analyzing the ordered ruleset 217 and FIG. 5 is a diagram of the dialogue system 100 providing a response. FIG. 4 is annotated with the letters A-E for stages of operations. Description of FIGS. 4-5 is more compact than the description of FIGS. 2-3 to avoid repetition. A user enters a query "Show me the rules for App123" at the machine 201. The machine 201 submits a corresponding user input 403 via the network 202 to the dialogue system 100. At stage A, the NLU component 101 generates an intent and extracts a named entity from the user input 403. For this example, the intent is "show rules" and the named entity is "App123." The NLU component 101 communicates a tuple 405 of the intent and extracted entity name to the grounding and intent mapping component 103. At stage B, the grounding and intent mapping component 103 grounds the named entity "App123" to the context of the organization based on the context data 209 in the repository 207. Again, the named entity App123 matches a representation for the same identifier App123 from a listing or catalogue of applications of the organization. At stage C, the grounding and intent mapping component 103 maps the intent "show rules" to a function template that queries the ruleset 217. The grounding and intent mapping component 103 then populates the template with the argument App123 to create a function instance. At stage D, the grounding and intent mapping component 103 communicates the ruleset query function instance to the ruleset edit impact assessor 105. Implementations can run the function instance for querying an ordered ruleset without passing it to a code unit that assesses impact (i.e., implementations can organize the program code differently). At stage E, the ruleset edit impact assessor 105 searches the ruleset 217 for rules with a field that indicates App123. In addition to multiple example uses of the dialogue system 100 being possible, realization of the examples may vary depending upon implementation of the dialogue system 100 and the firewall rules. For instance, an application may be identified by name in a rule or may be identified by port and address, service name, etc. The dialogue system 100 may query a data source to determine a port and address of an application name extracted from a user input. An intent may involve multiple analytical operations that do not involve ruleset configuration but cannot be answered with structural metadata. For instance, a user input may include an intent to determine whether an entity (e.g., engineering group) has access to a specified application. Answering this query can depend upon multiple rules and relationships among multiple rules, after resolving entities to other identifiers.

FIG. 5 is annotated with the letters F-H. At stage F, the information retrieval component 108 provides retrieved information to the augmentation component 110. The retrieved information in this example includes the result of a ruleset query. At stage G, the augmentation component 110 uses the retrieved information to create an augmented prompt to input to the generative language model 106. To create the augmented prompt, the augmentation component 110 constructs a prompt with the user input 403 and the result of the ruleset query for any rules that indicate App123. At stage H, the generative language model 106 generates a response 501 to the user input 403 informed with in-context learning based on the augmented prompt input by the augmentation component 110. In this example, the generative language model 106 generates the below response "These rules indicate App123.

Rule 21 192.168.3/16 App123 deny

Rule 22 vlan22**App123 allow"

Figure 6:
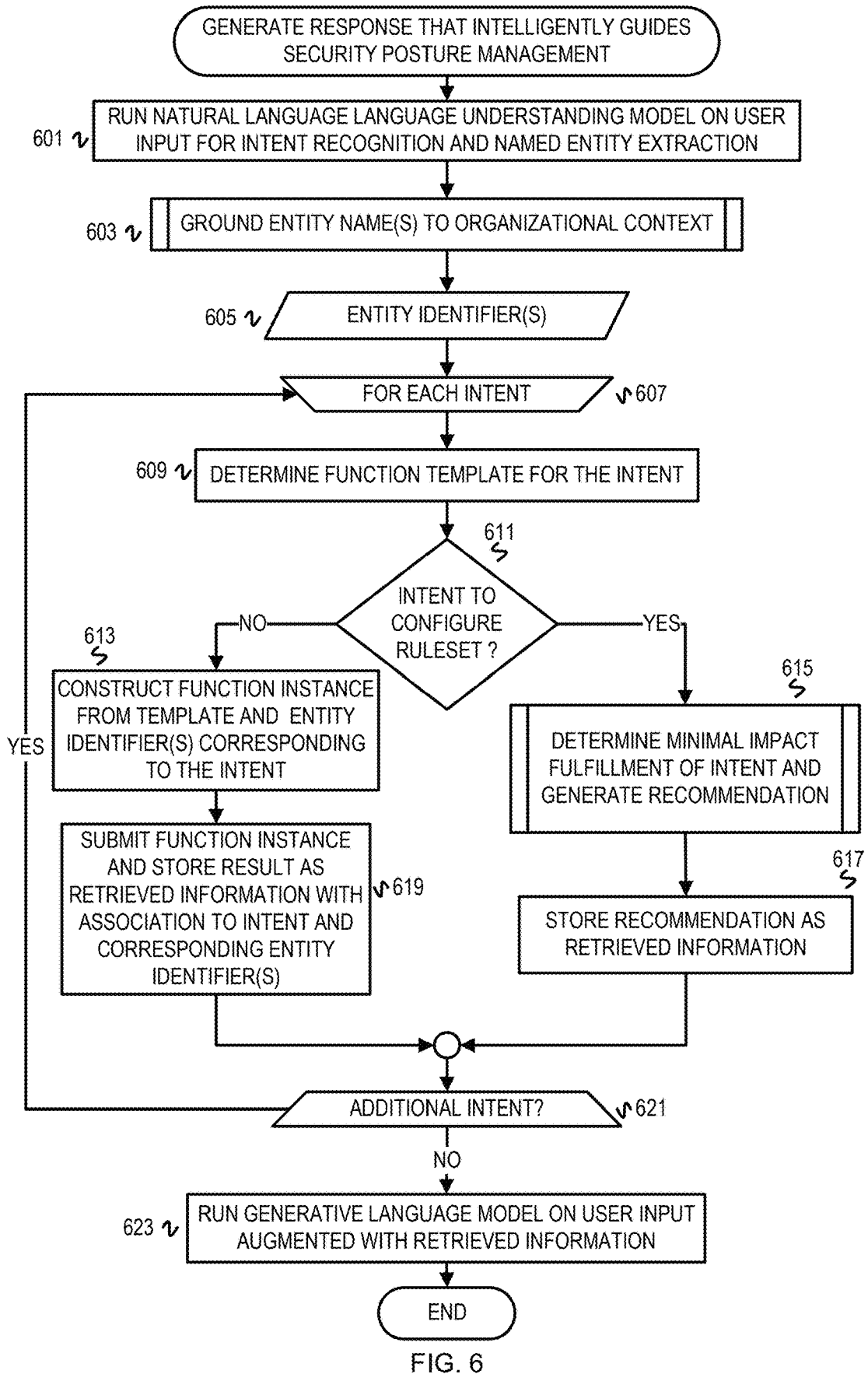
FIG. 6 is a flowchart of example operations for generating a response that intelligently guides security posture management.
Figure 8:
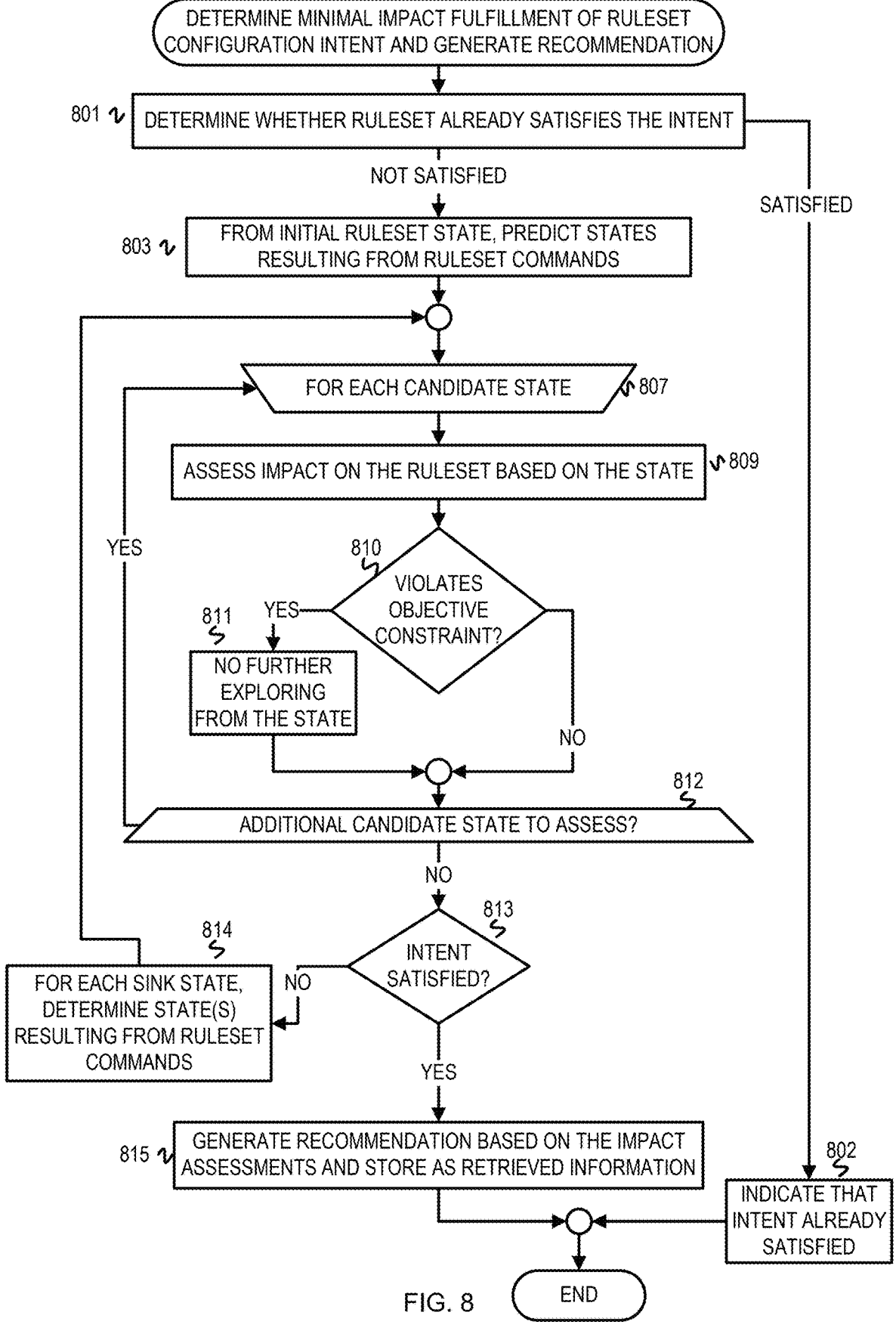
FIG. 8 is a flowchart of example operations for determining different implementations of a ruleset edit and assess impact(s).

FIGS. 6-8 are flowcharts of example operations for a security posture management dialogue system that are not specific to the example user inputs of the preceding figures. The example operations are described with reference to a neural dialogue system for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 6 is a flowchart of example operations for generating a response that intelligently guides security posture management. The flowchart does not include example operations for disambiguation or gathering additional context from a user and handling unsuccessful intent recognition/classification and/or unsuccessful named entity extraction. While implementations likely include this functionality, corresponding operations are not depicted in these flowcharts since it does not impact claim scope.

At block 601, a neural dialogue system runs a NLU model on a user input for intent recognition and named entity extraction. The NLU model is a pre-trained language model that has been fine-tuned or trained with few-shot prompting based on user inputs in a domain of security posture management relevant to an organization. The domain of security posture management includes multiple sub-domains including ruleset management, user management, applications management, configuration management, etc.

At block 603, the neural dialogue system grounds each extracted entity name to an organizational context. Often, an entity extracted from a user input does not conform to organizational identifiers of entities, including user entities, software entities, etc. Thus, the neural dialogue system grounds each extracted entity name to the organizational context to determine organizational identifiers that can be used in the defined functions of the organization. Later described FIG. 7 elaborates on this example operation. The grounding generates one or more entity identifiers 605.

At block 607, the neural dialogue system processes each of the intents recognized by the NLU model. The output of the NLU model may be post-processed to coalesce or merge intents deemed semantically similar and associated with same extracted entity names. The processing of each intent retrieves information that will form or influence a response to the user input. For this illustration, processing of each intent includes the example operations of blocks 609, 611, 613, 615, 617, and 619.

At block 609, the neural dialogue system determines a function template for the intent. An organization will have mapped a finite set of intents to function templates defined by the organization. If an intent does not map to a function template, the neural dialogue system obtains additional input from the user.

At block 611, the neural dialogue system determines whether the intent (or mapped function template) is to configure/edit the ruleset. Each of the function templates can include a classification or characterization indication that allows the neural dialogue system to at least distinguish function templates that will edit a ruleset from other function templates. If an intent has been conveyed instead of a function or API call, the intent will explicitly indicate configure or edit ruleset. If the intent/mapped function template does not relate to ruleset editing, operational flow proceeds to block 613. Otherwise, operational flow proceeds to block 615.

At block 615, the neural dialogue system determines how to fulfill the configure ruleset intent with minimal impact. With the determined implementation that fulfills the intent and an impact assessment, the neural dialogue system generates a recommendation for implementing the ruleset edit. FIG. 8 elaborates on the example operation of block 615.

At block 617, the neural dialogue system stores the recommendation as retrieved information. The neural dialogue system can designate or have allocated a location (e.g., folder or memory region) for hosting retrieved information that will be used for prompt augmentation as part of information retrieval and augmentation. Embodiments are not limited to storing a recommendation as part of information retrieval. Embodiments can include more of the result of the impact assessment in the retrieved information that will form the augmented prompt. Operational flow proceeds from block 617 to block 621.

If it was determined at block 611 that the function template did not relate to ruleset editing, then operational flow proceeded to block 613. At block 613, the neural dialogue system constructs a function instance from the mapped function template and the one or more of the entity identifier(s) 605 corresponding to the intent. To create the function instance, the neural dialogue system populates the function template with the entity identifier associated with the intent that mapped to the function template. If there are multiple entity identifiers, the dialogue system can determine the correct ordering of arguments based on metadata of the function template (e.g., parameter descriptions) and metadata of the entity identifiers. The entity identifier metadata may be based on source of the context space (e.g., configuration management space), data type, and/or additional information that can be retrieved from systems of the organization.

At block 619, the neural dialogue system submits the function instance and stores a result of the function instance as retrieved information. In the case of multiple intents to process for a user input, the neural dialogue system stores the result with an association or indication of the intent and corresponding entity identifier(s). This maintains organization of the retrieved information per intent.

At block 621, the neural dialogue system determines whether there is an additional intent to process. If so, operational flow returns to block 607. If not, operational flow proceeds to block 623.

At block 623, the neural dialogue system runs a generative language model on an augmented prompt. The neural dialogue system augments the user input with the retrieved information to generate the augmented prompt. The prompt augmentation can analyze the user input to determine ordering of retrieved information based on ordering of intent within the user input.

FIG. 7 is a flowchart of example operations for grounding entity name(s) to an organization context. For these example operations, it is presumed that grounding involves searching a semantic space for semantically similar entity identifiers based on representations of the entity names and entity identifiers. Semantic similarity can be measured based on Euclidean distance or cosine similarity of embeddings. Embodiments are not limited to using semantic similarity. Embodiments can instead use syntactic similarity (e.g., measured based on edit distance) or a combination of semantic and syntactic similarities. The example operations also presume multiple context spaces of the organization and prioritization of these spaces. Organizations can bound a context/semantic space as desired. Implementations can use existing boundaries, such as defined systems or databases (e.g., IAM system, configuration management database, etc.). While the example operations presume representations are used for efficient searching, embodiments are not so limited. It is also presumed that entity names have already been extracted for FIG. 7.

At block 701, the neural dialogue system begins processing each extracted entity name to obtain an entity identifier of an organization. The processing involves generating per context space representations and searching for a most similar representation.

At block 705, the neural dialogue system generates a representation of the entity name based on a first context space of an organization. The neural dialogue system uses a same algorithm used to generate the representation of the entity name as used to generate the representations of the entity identifiers in the first context space.

At block 707, the neural dialogue system searches the first context space for a most similar entity identifier representation. The neural dialogue system will search semantic representations, for example, generated from a language model within a semantic space established with user identifiers in an IAM database.

At block 709, the neural dialogue system determines whether a similar representation was found that satisfies a similarity threshold. If a representation was found that satisfies the similarity threshold, then operational flow proceeds to block 711. If a representation was not found that satisfies the similarity threshold, then operational flow proceeds to block 713.

At block 711, the neural dialogue system sets the entity identifier for the entity name. The neural dialogue system maintains associations between the entity identifiers and the entity identifier representations. After finding an entity identifier representation in the first context space that satisfies the similarity threshold, the neural dialogue system can look up the corresponding entity identifier. Operational flow proceeds from block 711 to block 719.

At block 713, the neural dialogue system generates a representation of the entity name for each additional context space. The example operations presume a paradigm that prioritizes a first context space and can search additional context spaces in parallel if a match is not found in the first context space. In the case of semantic representations, the neural dialogue system would generate a representation with the algorithm or technique used for the respective context space. For example, a language model can be invoked for each context space to generate embeddings for context spaces. An implementation could use multiple language models to generate embeddings for multiple context spaces.

At block 715, the neural dialogue system searches the context spaces for the most similar organization identifier representations. For instance, the neural dialogue system would search semantic representations of device identifiers in the configuration management semantic space with a semantic representation of the entity name generated for the configuration management semantic space. The neural dialogue system would also search semantic representations of application identifiers in the application catalog semantic space with a semantic representation of the entity name generated for the application catalog semantic space.

At block 717, the neural dialogue system sets the entity identifier corresponding to the most similar representation for the entity name. Embodiments can adjust similarity with weights assigned to the different context spaces to bias towards a context space. The neural dialogue system can maintain an association between the entity identifier and the entity name for various purposes (e.g., auditing, incorporation into the response, etc.). The neural dialogue system can also provide transparency into the similarity measurements.

At block 719, the neural dialogue system determines whether there is an additional entity name to process. If there is an additional entity name to process, operational flow returns to block 701. Otherwise, operational flow proceeds to block 721.

At block 721, the entity identifiers set for the entity names are returned. Block 721 assumes some modularization of functionality within the neural dialogue system. For instance, the entity identifiers are returned to another calling function of the neural dialogue system.

FIG. 8 is a flowchart of example operations for determining minimal impact fulfillment of a ruleset configuration/edit intent and generating a recommendation. Impact assessment allows the neural dialogue system to provide a response indicating a lowest impact implementation of a ruleset edit. As previously stated, an organization can define a function template for editing a ruleset but allow a reasoning engine to determine an implementation with a least impact. The example operations of FIG. 8 refer to a ruleset configuration intent, which may be a generated natural language intent or a function instance mapped to the intent. The operations do not delve into the implementation details of building a data structure (e.g., graph) representing the successive determination of states and impacts assessment per path in the graph (i.e., sequence of commands and states) since substantial variation is possible.

At block 801, the neural dialogue system determines whether the ordered ruleset already satisfies the ruleset configuration intent. For example, a rule is created that represents the edit intent and could be inserted into a ruleset but is instead used to evaluate intent fulfillment ("pseudo rule"). The pseudo rule would satisfy the user intent when inserted into the ruleset. The neural dialog system uses a reasoning engine to analyze a model of the ruleset to determine whether an existing rule already matches the pseudo rule or an existing rule would overlap with the pseudo rule. In this case, the neural dialogue system determines that the intent is already satisfied.

If the neural dialogue system determines that the configuration intent is already satisfied at block 801, then the neural dialogue system indicates that the intent is already satisfied at block 802. For instance, the neural dialogue system stores the indication as retrieved information to be part of an augmented prompt. In some cases, the neural dialogue system determines that the configuration intent is partially satisfied. For example, engineering may be split into two groups ENG_A and ENG_B. If the intent is to give all of engineering access to App123 and the ruleset allows ENG_A access to App123, then the intent is partially satisfied. The neural dialogue system can return a response based on this determination of partial satisfaction of the intent to obtain an additional utterance from the user. The neural dialogue system can proceed with determining a minimal impact that fulfills the other part of the intent or other sub-intent.

If the neural dialogue system determines that the configuration intent is not satisfied by the existing ruleset at block 801, then operational flow proceeds to block 803. At block 803, the neural dialogue system determines next states or candidate states of the ruleset with respect to the initial state (i.e., state of the existing ruleset) that would result for each configuration command that could be performed. The neural dialogue system iterates through each ruleset configuration to determine the candidate state resulting from the initial state if the command is performed. If a model of the ruleset is used, then the neural dialogue system updates a working copy of the model or a model state. For instance, if the command sequence is an INSERT and DISABLE, then the model state is updated to reflect the relationships among rule components based on insertion of a new rule and then updates model state based on disabling an existing rule. Implementations may filter configuration commands to evaluate based on the source state (in this case the initial state) and heuristics that can be used to eliminate from consideration a command that would be invalid based on the source state. For instance, the DELETE command may not be considered from an initial state of the ruleset.

At block 807, the neural dialogue system begins evaluating each of the candidate states to assess impact and determine continuation of exploration. Depending upon implementation, the neural dialogue system assesses the sink states (nodes in a graph representing states and having out degree of 0).

At block 809, the neural dialogue system assesses impact on the ruleset based on the candidate state of the ruleset. Based on the candidate state of the ruleset, the neural dialogue system determines whether any ruleset anomalies are created. For example, the neural dialogue system runs a SMT solver to determine whether any of the formulas corresponding to anomalies is satisfied.

At block 810, the neural dialogue system determines whether the assessed impact violates an objective constraint (e.g., anomaly delta ceiling of 2). If the assessed impact violates the objective constraint, then the dialogue system discontinues exploring from the candidate state at block 811. If the assessed impact does not violate the objective constraint, then operational flow proceeds to block 812.

At block 812, the neural dialogue system determines whether there is an additional candidate state to assess. If there is an additional candidate state to assess, operational flow returns to block 807. Otherwise, operational flow proceeds to block 813.

At block 813, the neural dialogue system determines whether the configuration intent is satisfied. The neural dialogue system determines whether any one of the candidate states fulfills or satisfies the intent. If at least one of the candidate states satisfies the intent, then operational flow proceeds to block 815. If not, operational flow proceeds to block 814.

At block 814, the neural dialogue system determines, for each explorable sink state, state resulting from performing each of ruleset commands. For instance, the neural dialogue system selects one of multiple candidate states having 0 out degree (state s2) and determines the next state that would result if REORDER was performed given s2 and then determines the next state resulting if MERGE was performed given s2, and so forth. Operational flow proceeds to block 807.

At block 815, the neural dialogue system generates a recommendation based on the impact assessments. The neural dialogue system stores the recommendation as retrieved information for prompt augmentation. Implementations can vary the amount of information provided in the recommendation. For example, the recommendation can indicate the command sequence of the path leading to a state that fulfills the intent with the lowest impact or the function instance populated with values based on the command sequence (e.g., indicating the configuration commands of INSERT and REORDER as action values in a Hypertext Transfer Protocol (HTTP) field of the function instance). Implementations can include the impact assessment in the recommendation (e.g., which, if any anomalies are created), include the other assessed command sequences, etc.

Embodiments can determine minimal impact fulfillment of a ruleset configuration intent with implementations that vary from the example operations of FIG. 8. For instance, exploration may continue until a termination criterion is satisfied despite a state being found that satisfies the ruleset configuration intent. As examples, a termination criterion of a path length of n can be defined with triggering of disambiguation dialogue indicating that the intent remains unfulfilled at termination of exploration. As another example, implementations can define a dynamic termination criterion that explores m additional states after a path is found with a state that satisfies the intent. Furthermore, the example operations suggest a build and explore approach that resembles breadth first search paradigm. Implementations can build and explore according to other paradigms, such as a depth first search paradigm.

Variations

Responses generated by the described neural dialogue system included user interaction before performing a ruleset edit or configuration change. A particular user input specifying approval of a recommended implementation of a ruleset edit can be required before executing. Embodiments can present multiple options with the impact assessments and allow a user to choose which function implementation the system will execute. Embodiments can provide for at least some additional efficiency without the constraint of user approval. Allowing automated ruleset configuration from a user input in a dialogue without an additional approval constraint provides flexibility in security posture management and overcomes the challenges created by the scale of rulesets and the ordering constraint. The neural dialogue system can execute the lowest impact ruleset edit implementation and report that the edit has been performed instead of the additional transaction overhead of user review and approval.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, embodiments can distinguish intents at a finer granularity than depicted in FIG. 6. Different execution paths can be implemented for ruleset edit intents, metadata query intents, IAM configuration intents, etc. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 9:
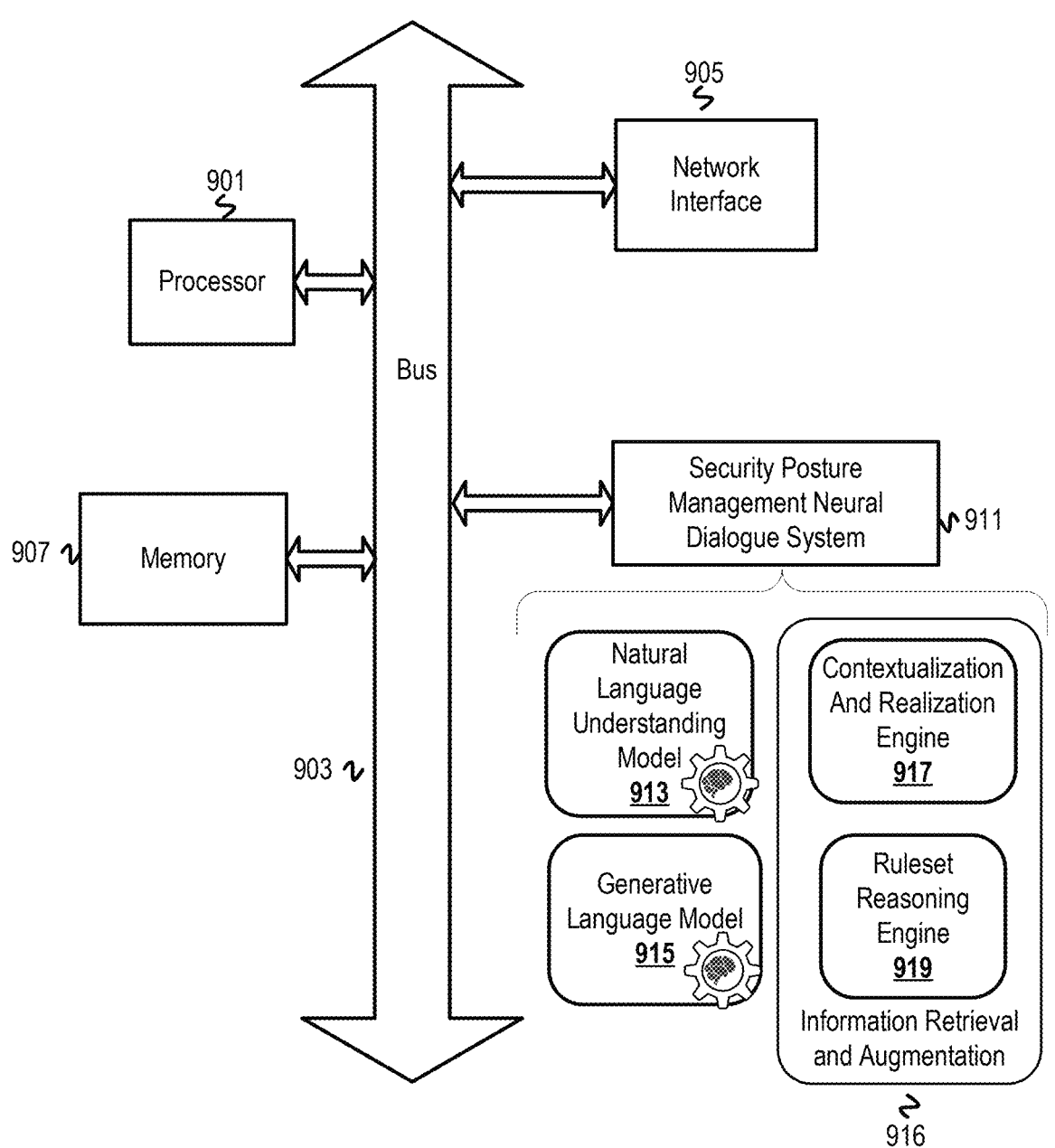
FIG. 9 depicts an example computer system with a security posture management neural dialogue system.

FIG. 9 depicts an example computer system with a security posture management neural dialogue system. The computer system includes a processor 901 (possibly including multiple processors, multiple cores, multiple nodes, and/or implementing multi-threading, etc.). The computer system includes memory 907. The memory 907 may be system memory or any one or more of the above already described possible realizations of machine-readable media. The computer system also includes a bus 903 and a network interface 905. The system also includes a security posture management neural dialogue system 911. The security posture management neural dialogue system 911 conducts a dialogue with a user to facilitate security posture management. Through dialogue with the dialogue system 911, a user can edit an ordered ruleset across security appliances (e.g., firewalls), manage users, edit configurations of nodes in a security infrastructure, etc. The security posture management neural dialogue system 911 includes a NLU model 913, a generative language model 915, and an information retrieval and augmentation component 916. The NLU model 913 is a language model (e.g., transformer-based large language model) that performs intent classification/recognition on a user input utterance which can be spoken or written. The NLU model 913 also extracts entity names from utterances. The NLU model 913 passes intents and extracted entity names to the information retrieval and augmentation component 916. The information retrieval and augmentation component 916 retrieves information according to the intents and extracted entity names and augments the utterance with retrieved information to create an augmented prompt that is fed into the generative language model 915 which then generates a response based on the augmented prompt. The information retrieval and augmentation component 916 includes a contextualization and realization engine 917 and a ruleset reasoning engine 919. The contextualization and realization engine 917 grounds extracted entity names to a context of an organization. The contextualization and realization engine 917 realizes intents by mapping the intents to defined function templates and then instantiating functions based on the mapped templates and grounded entity names. The ruleset reasoning engine 919 determines a lowest impact implementation of a ruleset edit intent. The ruleset reasoning engine 919 operates based on rules and constraints defined to represent an ordered ruleset and how an ordered ruleset is enforced. The ruleset reasoning engine 919 determines ruleset anomalies that would be created based on a configuration command or sequence of configuration commands to fulfill a ruleset configuration intent. Any one of the previously described functionalities may be partially (or entirely) implemented in hardware and/or on the processor 901. For example, the functionality may be implemented with an application specific integrated circuit, in logic implemented in the processor 901, in a co-processor on a peripheral device or card, etc. Further, realizations may include fewer or additional components not illustrated in FIG. 9 (e.g., video cards, audio cards, additional network interfaces, peripheral devices, etc.). The processor 901 and the network interface 905 are coupled to the bus 903. Although illustrated as being coupled to the bus 903, the memory 907 may be coupled to the processor 901.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:

using a first language model to determine from a user input a first intent and a first set of one or more entity identifiers;

grounding the first set of entity identifiers to a context of an organization to generate a second set of one or more entity identifiers;

determining first information for responding to the user input based, at least in part, on at least one of querying metadata of a security ruleset of the organization and analyzing the security ruleset, wherein the querying and/or analyzing is based, at least in part, on the first intent and the second set of entity identifiers, wherein determining the first information comprises, determining whether structural metadata of the security ruleset would satisfy the first intent;

based on determining that structural metadata of the security ruleset would satisfy the first intent, invoking a function with at least one of the second set of entity identifiers as an argument to query the structural metadata and obtain at least a part of the first information; and based on determining that structural metadata of the security ruleset would not satisfy the first intent, determining a set of one or more commands to perform on the security ruleset that satisfies the first intent and yields at least a part of the first information; and communicating the first information for responding to the user input.

2. The method of claim 1, wherein determining a set of one or more commands to perform on the security ruleset comprises:

selecting multiple of a plurality of ruleset commands;

for each selection, determining a sequence of ruleset commands starting with the selected ruleset command and based on the plurality of ruleset commands;

assessing impact of the sequence of ruleset commands on the security ruleset; and determining which of the sequences of ruleset commands has a lowest impact, wherein the set of one or more commands is the sequence of ruleset commands with the lowest impact.

3. The method of claim 2, wherein assessing impact of each sequence of ruleset commands comprises, for each sequence of ruleset commands, determining state of the security ruleset that would result if the sequence of ruleset commands is performed and corresponding impact after performance of each ruleset command in the sequence of ruleset commands.

4. The method of claim 2, wherein assessing impact of each sequence of ruleset commands comprises determining ruleset anomalies that would be created.

5. The method of claim 2, wherein communicating the first information for responding to the user input comprises indicating a recommendation based on the set of one or more commands.

6. The method of claim 5, wherein communicating the first information comprises indicating the impact assessment for the set of commands.

7. The method of claim 1, wherein grounding the first set of entity identifiers to a context of the organization to generate a second set of one or more entity identifiers comprises, for each of the first set of entity identifiers, generating a representation based on natural language processing and determining a most similar of a plurality of entity identifier representations previously generated from context data of the organization.

8. The method of claim 7, wherein determining the most similar of the plurality of entity identifier representations comprises determining similarity according to priority of the context data.

9. The method of claim 1, wherein the context of the organization further comprises at least one of configuration management data and content management data.

10. A non-transitory, machine-readable medium having program code stored thereon, the program code comprising instructions to:

invoke a first language model on a user input to determine a first intent and a first set of one or more entity identifiers for the user input;

ground the first set of entity identifiers to a context of an organization to generate a second set of one or more entity identifiers;

determine whether structural metadata of a ruleset would satisfy the first intent;

based on a determination that structural metadata of the ruleset would satisfy the first intent, invoke a function with at least one of the second set of entity identifiers as an argument to query the structural metadata;

based on a determination that structural metadata of the ruleset would not satisfy the first intent, determine a set of one or more ruleset commands based, at least in part, on the first intent and the second set of entity identifiers; and generate a response for the user input based, at least in part, on the set of one or more ruleset commands.

11. The non-transitory machine-readable medium of claim 10, wherein the instructions to determine a set of one or more ruleset commands based, at least in part, on the first intent and the second set of entity identifiers comprise instructions to:

select multiple of a plurality of ruleset commands;

for each selection, determine a sequence of ruleset commands that starts with the selected ruleset command and based on the plurality of ruleset commands;

assess impact of the sequence of ruleset commands on the ruleset; and determine which of the sequences of ruleset commands has a lowest impact, wherein the set of one or more commands is the sequence of ruleset commands with the lowest impact.

12. The non-transitory machine-readable medium of claim 11, wherein the instructions to assess impact of each sequence of ruleset commands on the ruleset comprise instructions to determine state of the ruleset that would result if the sequence of ruleset commands is performed and which, if any, anomaly or anomalies would be created.

13. The non-transitory machine-readable medium of claim 10, wherein the instructions to ground the first set of entity identifiers to a context of the organization to generate a second set of one or more entity identifiers comprise instructions to, for each of the first set of entity identifiers, generate a representation based on natural language process-
ing and determine a most similar of a plurality of entity
identifier representations previously generated from context
data of the organization.

14. An apparatus comprising:
    a processor;
    a machine-readable medium having instructions stored
        thereon, the instructions executable by the processor to
        cause the apparatus to,
    invoke a neural language model to generate a task-based
        intent of an utterance in a dialogue and identify a set of
        one or more entities from the utterance;
    determine organization-based entity identifiers for the
        identified set of entities based, at least in part, on data
        of an organization;
    determine whether the task-based intent corresponds to
        analyzing an ordered ruleset of the organization;
    based on a determination that the task-based intent cor-
        responds to analyzing the ordered ruleset,
        determine a plurality of sequences of commands to
            perform on the ordered ruleset based, at least in part,
            on the task-based intent and the set of entities; and
        for at least a subset of the plurality of sequences of
            commands, determine anomaly-based impact on the
            ordered ruleset if the sequence of commands is
            performed; and
    generate a response corresponding to the utterance based,
        at least in part, on the determined anomaly-based
        impact on the ordered ruleset.

15. The apparatus of claim 14, wherein the instructions to
determine organization-based entity identifiers for the iden-
tified set of entities comprise the instructions being execut-
able by the processor to cause the apparatus to, for each of
the identified set of entities, generate a representation based
on natural language processing and determine a most similar
of a plurality of organization-based entity identifier repre-
sentations previously generated from context data of the
organization.

16. The apparatus of claim 14, wherein the instructions to
determine anomaly-based impact on the ordered ruleset for
each of the subset of the sequences of commands if per-
formed comprise instructions executable by the processor to
cause the apparatus to, for each of the subset of the
sequences of commands, determine state of the ordered
ruleset that would result if the sequence of commands is
performed and corresponding anomaly-based impact after
performance of each ruleset command in the sequence of
ruleset commands.

17. The apparatus of claim 14, wherein the instructions to
generate the response comprise instructions executable by
the processor to cause the apparatus to indicate a recom-
mendation for one of the subset of sequences of commands
based on the anomaly-based impacts.

18. The apparatus of claim 14, wherein the machine-
readable medium further has stored thereon instructions
executable by the processor to cause the apparatus to query
structural metadata of the ordered ruleset based on a deter-
mination that the task-based intent does not correspond to
analyzing the ordered ruleset.

19. The non-transitory machine-readable medium of
claim 11, wherein the instructions to generate a response for
the user input comprise instructions to indicate the impact
assessment for the set of ruleset commands and to indicate
a recommendation based on the set of one or more ruleset
commands.

20. The non-transitory machine-readable medium of
claim 10, wherein the instructions to determine whether
structural metadata of the ruleset would satisfy the first
intent comprises the instructions to determine whether the
first intent is to query the ruleset or to edit or configure the
ruleset, wherein structural metadata can satisfy a query type
of intent.

* * * * *